United States Patent [19]

Rao et al.

[11] Patent Number: 4,983,716
[45] Date of Patent: Jan. 8, 1991

[54] NON-AQUEOUS DISPERSIONS

[75] Inventors: Madhukar Rao, Brecksville; Richard F. Tomko, North Olmsted; Daniel R. Sayre, Lowellville, all of Ohio

[73] Assignee: The Sherwin-Williams Company

[21] Appl. No.: 464,841

[22] Filed: Jan. 16, 1990

[51] Int. Cl.$^5$ ............................................. C08C 63/02
[52] U.S. Cl. ..................................... 528/272; 528/274; 528/288; 528/289; 528/295.5; 528/296; 528/300; 528/302; 528/303; 528/306; 528/392; 525/437; 525/440; 525/445; 525/447; 525/448; 524/186; 524/197; 524/206; 523/500; 523/503; 523/508; 523/523
[58] Field of Search ............... 528/272, 274, 288, 289, 528/295.5, 296, 300, 302, 303, 306, 352; 525/437, 440, 445, 447, 448; 524/186, 197, 206; 523/500, 503, 508, 523

[56] References Cited

U.S. PATENT DOCUMENTS

| | | | |
|---|---|---|---|
| 3,198,759 | 8/1965 | Schmidle | 524/848 |
| 3,779,977 | 12/1973 | Hicks | 220/457 |
| 3,882,006 | 5/1975 | Watanabe et al. | 204/159.15 |
| 4,111,871 | 9/1978 | Aritoni | 525/7.1 |
| 4,206,099 | 6/1980 | Bentley et al. | 528/295.5 |
| 4,511,692 | 4/1985 | Anderson et al. | 525/7 |
| 4,530,957 | 7/1985 | Theodore et al. | 524/504 |

FOREIGN PATENT DOCUMENTS

| | | |
|---|---|---|
| 990154 | 4/1965 | United Kingdom . |
| 992635 | 5/1965 | United Kingdom . |
| 1007723 | 10/1965 | United Kingdom . |
| 1319781 | 6/1973 | United Kingdom . |
| 2164050 | 3/1986 | United Kingdom . |
| 2170810 | 8/1986 | United Kingdom . |

Primary Examiner—John Kight, III
Assistant Examiner—S. A. Acquah
Attorney, Agent, or Firm—Steven W. Tan; Robert E. McDonald

[57] ABSTRACT

This invention relates to high solids alkyds, non-aqueous dispersions, and coating compositions containing those alkyds and non-aqueous dispersions, having nonvolatile materials contents greater than about 75% NVM, with very low volatile organic contents of less than 305 g/l, which exhibit excellent stability, viscosity and tack-free and dry times when formulated as air dry coating compositions.

33 Claims, No Drawings

NON-AQUEOUS DISPERSIONS

BACKGROUND OF THE INVENTION

Non-aqueous dispersions (NAD's) are well known in the art and typically consist of dispersions of addition polymers in a relatively non-polar non-aqueous liquid. For example, U.S. Pat. No. 3,198,759 teaches dispersions of addition polymers in a hydrocarbon medium. The hydrocarbon medium contains one or more aliphatic hydrocarbons containing dissolved therein an alkyd formed by either the direct esterification of a drying oil fatty acid with a dicarboxylic acid and a polyhydric alcohol or the indirect esterification of a drying oil by first alcoholization with a polyhydric alcohol and second esterification with a polybasic acid. European Patent Application No. 0 310 331 A2 teaches a non-aqueous dispersion of a soluble low molecular weight non-alkyd polymer which is attached or adsorbed onto a second non-soluble alkyd-free polymer. U.S. Pat. No. 4,530,957 teaches non-aqueous dispersions based on crosslinked acrylic polymer particles dispersed in a non-aqueous medium having a polymeric dispersion stabilizer. The polymeric dispersion stabilizer can be an alkyd which is formed by the self condensation of 12-hydroxystearic acid followed by a capping reaction with an alkyl monocarboxylic acid. U.S. Pat. No. 4,206,099 teaches non-aqueous dispersions of crosslinked polymer particles in a non-aqueous medium having an amphipathic steric stabilizing agent. The steric stabilizing agent can be a graft copolymer obtained by reacting a low molecular weight carboxyl group terminated condensate of linseed oil fatty acids and 12-hydroxystearic acid with acrylic copolymers. U.S. Pat. No. 3,779,977 teaches non-aqueous dispersions of an acrylonitrile copolymer in a liquid butadiene homopolymer or copolymer in a non-polar organic hydrocarbon liquid.

A review of those patents clearly shows that most NAD's have solids contents in a range generally less than 60% by weight and have relatively high volatile organic contents due to the non-polar hydrocarbon liquid dispersing medium. Attempts to lower the VOC content of these NAD's has led to compositions which either gell unacceptably, exhibit extremely high viscosities, are not stable for any appreciable length of time or exhibit extremely long and unacceptable dry times as air dry coatings. Typically, such NAD's can not be dried at all without the assistance of heat or catalysis.

In attempting to decrease the VOC contents of NAD's, we have found that alkyds produced via the traditional process which comprises the alcoholysis of a drying oil followed by reaction with a polybasic acid produces alkyds of extremely high viscosity. Use of such alkyds in a non-aqueous dispersion forces the formulator to use a large amount of solvent to lower viscosity. This in turn causes the VOC of the NAD to increase unacceptably. Additionally, we have found that alkyds can be produced via the traditional fatty acid esterification process and have a moderate viscosity. While such a process can produce stable NAD's, it is limited in the ability to produce NAD's having NVM's greater than about 70% and VOC's less than about 350 g/l.

By contrast, this invention produces very high solids NAD's, greater than about 75% NVM, with very low VOC's of less than 305 g/l, which exhibit excellent stability, viscosity and tack-free and dry times when formulated as air dry coating compositions. These NAD's are the result of a new and unique process for producing NAD's which comprises a novel alkyd composition.

SUMMARY OF THE INVENTION

This invention relates to novel, high solids, low VOC non-aqueous dispersions (NAD's) and a process for producing those non-aqueous dispersions. The NAD's of this invention comprise a novel alkyd as the dispersing medium for the polymerization product of one or more monomers which are non-soluble in the alkyd medium. The NAD's of this invention differ from conventional NAD's in that they are the product of a process which begins with the production of an alkyd having a high molecular weight yet surprisingly low viscosity when compared to typical high solids alkyds. The use of this alkyd as the dispersing medium for the polymerization of the dispersed monomers yields NAD's having non-volatile materials (NVM) contents greater than about 75% by weight, typically approaching 100% NVM, having volatile organic contents (VOC) typically less than about 305 g/l, preferably less than about 250 g/l, which NAD's exhibit excellent dry times not heretofore associated with very high solids alkyds or NAD's. The NAD's of this invention are particularly suited for interior and exterior applications in the architectural, industrial maintenance, and traffic paint and coatings industries.

The process for producing the NAD's of this invention comprises using a unique reaction process for forming a modified oil alkyd and then using this alkyd as the dispersing medium, either alone or in combination with some minor amount of hydrocarbon solvent, for the polymerization of monomers which are predominantly insoluble in the alkyd medium. In particular, the alkyd is formed by a two-step process having as a first step the acidolysis reaction of a triglyceride oil. The acidolysis of the triglyceride oil is carried out with a trifunctional carboxylic acid. The second step of the reaction comprises reacting the intermediate of the first step with a trifunctional alcohol or a mixture of tri- and di- functional alcohols. The novel alkyd is used as the dispersing medium for the reaction of monomers which when reacted produce a polymer which is not soluble in the alkyd medium. The alkyd can be used alone as the dispersing medium or in the presence of a small amount of an aliphatic hydrocarbon solvent. The monomers are polymerized in the presence of the alkyd to produce the novel NAD's of this invention.

Accordingly, it is an object of this invention to teach novel alkyds and non-aqueous dispersions.

It is another object of this invention to teach a high solids, low VOC non-aqueous dispersion having acceptable air dry times.

It is a further object of this invention to teach a process for producing high solids, low VOC non-aqueous dispersions having acceptable air dry times.

DETAILED DESCRIPTION OF THE INVENTION

As stated above, the process for producing the NAD's of this invention comprises forming a novel modified oil alkyd and using this alkyd as the dispersing medium, either alone or in combination with some hydrocarbon solvent, for the polymerization of monomers which are predominantly insoluble in the alkyd medium. The alkyd used in these NAD's is not formed by any of the traditional processes such as fatty acid esterification or alcoholysis of a drying oil with later reaction with a di- or tri- basic acid. Rather, the alkyds used in this invention are formed by a two-step process wherein the first step comprises the acidolysis reaction of a triglyceride oil with a trifunctional carboxylic acid or a trifunctional anhydride, and the second step comprises reacting the product of the first step with a multifunctional alcohol.

The alkyds of this invention differ from the conventional alkyds in that a much higher molecular weight can be achieved without an unacceptable increase in viscosity. Higher molecular weight alkyds provide the basis for a high solids, low VOC composition. The high viscosity weight of such a composition enables the air dry time of the composition to be very short.

The triglyceride oil used in the formation of the alkyd can be selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil and mixtures thereof. Particularly preferred are those oils containing unsaturation in the glyceride chains. Particularly preferred are soya oil, dehydrated castor oil and linseed oil.

To form the alkyd, the triglyceride oil is first reacted via an acidolysis reaction with a trifunctional carboxylic acid such as trimellitic acid, trimesic acid, 1,3,5-pentane tricarboxylic acid, citric acid or a trifunctional anhydride such as trimelletic anhydride, pyromellitic anhydride, or mixtures of such acids and/or anhydrides.

The intermediate from the acidolysis step is further reacted with a trifunctional alcohol selected from the group consisting of trimethylol propane, trimethylol ethane, glycerine, tris hydroxyethyl isocyanurate, and mixtures thereof, either alone or in combination with a difunctional alcohol selected from the group consisting of ethylene glycol, propylene glycol, cyclohexane dimethanol, and mixtures thereof. Additionally, dimethylol propionic acid can be used in combination with the trifunctional alcohol. Trifunctional alcohols are particularly preferred due to the degree of branching they allow. Difunctional alcohols, if used, are preferably used as a minor component in combination with trifunctional alcohols. Depending on the desired molecular weight and viscosity, a portion of monofunctional alcohol, or monobasic acid such as soya fatty acid, linseed oil fatty acid or crotonic acid, up to about 20% by weight of the total alkyd can be added with the multifunctional alcohol to control molecular weight and act as a chain stopper.

The order of reactions, i.e. acidolysis with a trifunctional acid or anhydride, followed by alcoholysis with a trifunctional alcohol, is critical to the formation of the high molecular weight, low viscosity alkyd of this invention.

The amounts of oil, acid and alcohol used should be such that the resulting alkyd has a high degree of branching, a z-average molecular weight, $M_z$, greater than or equal to about 20,000, an oil length of between about 65% and 85%, and a hydroxyl number less than 60, preferably less than 45.

In the first step of the reaction, the proportion of triglyceride oil to acid or anhydride should be such that the moles of carboxylic acid equivalents contributed from the acid or anhydride is approximately 2 to 3 times the moles of carboxylic ester equivalents contributed by the oil.

For example, trimelletic anhydride has a carboxylic acid functionality of about 3 whereas soya oil has a carboxylic ester functionality of about 1. Thus, a molar ratio of acid:oil of 1:1 would result in a molar functionality ratio of acid:ester of about 3:1. To achieve the molar acid:ester functionality ratio in the range of 2:1 to 3:1, generally the ratio of moles acid:oil should be approximately 1:1.75 to 1:1.

The oil and the acid should be charged into a reactor equipped with an inert gas blanket and a mechanical stirrer. The two reactants should be heated to a temperature greater than or equal to about 450° F., preferably to a temperature of about 480° F. This temperature should be held for a sufficient time period to allow the complete reaction of the two reactants. Typically, at this temperature, the reaction takes approximately one hour. If desired, a reaction catalyst such as lithium hydroxide monohydrate, barium hydroxide, or di-butyl tin oxide can be added in an amount of approximately 0.02% by weight of oil. The intermediate produced by this acidolysis reaction should be cooled to about 350° F. in preparation for the second step of the reaction.

In the second step of the reaction, the amount of multifunctional alcohol should be such that the moles of hydroxyl equivalents contributed by the alcohol is in excess over the moles of carboxylic acid equivalents contributed by the acid or anhydride. Thus, for a trifunctional alcohol such as trimethylol ethane, and a trifunctional acid such as trimelletic anhydride, the molar ratio of alcohol:anhydride should be about 1:1 to about 1:5:1. The alcohol is preferably added in bulk to the reaction vessel containing the product of the acidolysis reaction, although the alcohol can be added in two or more charging stages. The temperature is raised to between about 425.F and 500 F and these reaction conditions are maintained for so long as necessary to bring the acid value of the solution below about 15, preferably below about 10. During this stage of the reaction, some additional hydrocarbon solvent such as xylene can be added to the vessel to facilitate the removal of water from the reaction solution.

As stated above, the molecular weight, $M_z$, of the resulting alkyd should be greater than or equal to about 20,000, the oil length should be between about 65% and 85%, and the hydroxyl number should be less than 60, preferably less than 45. These alkyds have non-volatile materials contents approaching 100% NVM.

The alkyd is especially suitable for use in non-aqueous dispersions as the dispersing medium, either alone or in combination with some amount of aliphatic hydrocarbon solvent, to act as the polymerizing medium and to disperse insoluble monomers and polymers. The NAD's made using these alkyds typically have NVM's of about 75% or more, have very low viscosities, have volatile organic contents less than 305 g/l, preferably less than 250 g/l, and exhibit excellent air dry times using conventional metallic drier compounds.

When preparing non-aqueous dispersions using the novel alkyd above, the monomers should be selected from monomers which would produce a polymer via the free radical addition reaction mechanism which is predominantly insoluble in the alkyd medium. It is highly preferred that at least one of the monomers contain hydroxy functionality. Most preferably, between about 5% and 35% by weight of the monomer charge comprises hydroxy functional monomers. Suitable monomers can be selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, methyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof. In addition to pure monomers, preformed polymers and polymeric intermediates can be included in the reaction charge.

To prepare the non-aqueous dispersions of this invention, the alkyd dispersing medium is used as the polymerization medium for the monomer charge. The alkyd medium can be diluted with mineral spirits or other solvent if desired, with the primary limitation being concern for the VOC of the composition. Approximately 500 g of mineral spirits may be used to dilute every 300 to 400 g of alkyd.

The total amount of alkyd contained in the reaction vessel, including any alkyd which may be added with the monomer charge, can comprise between about 25% to about 99%, preferably from about 30% to about 60%, most preferably between about 40% to about 55%, by weight of the total alkyd and total monomer charged to the vessel. The free radical addition monomer charge should, after completely added to the reaction vessel, account for approximately 1% to about 75%, preferably between about 40% to about 70%, by weight of the total alkyd and total monomer charged to the vessel, most preferably between about 45% to about 60%. A chain transfer agent such as methyl mercaptopropionate or 2-mercapto ethanol must also be added to the vessel in an amount from about 0.1% to about 6.0% by weight of monomer. An initiator selected from the group consisting of t-butyl peroctoate, t-amyl peroctoate, cumene hydroperoxide, and t-butyl perbenzoate is also preferably added.

All free radical addition reactants are preferably added via dropwise addition over a period of time to the alkyd dispersing medium. The monomer charge can be added pure, or, in a preferred embodiment, the monomers can be dispersed in an amount of the alkyd of this invention prior to addition to the dispersing medium. The amount of alkyd used for such a dispersion should be included in the calculation of the overall amount of alkyd present in the reaction vessel.

The temperature of the solution in the reaction vessel should be maintained between about 200° F. and 250° F. for the entire period that monomer charge is being added. Upon completion of the monomer addition, a chaser composition comprising cumene hydroperoxide and vanadium naphthenate is added over a period of about 90 minutes. Upon completion of the chase composition, the temperature should be maintained between 200° F. and 250° F. for approximately one hour. At the end of that hour, the heat is removed and the contents of the vessel are filtered.

The non-aqueous dispersions of this invention can be used alone as coating compositions, or, in the alternative, they can be formulated with other readily available, standard paint ingredients and components such as rheology modifiers, thixatropes, extenders, colors and pigments, solvents, anti-skinning agents, drying agents, dispersants and surfactants, fungicides, mildewcides, preservatives, UV absorbers, anti-marring agents, flow and leveling agents, fragrances, defoaming agents, chelating agents, flattening agents, and anti-rusting agents.

In addition to the above, the non-aqueous dispersions of this invention are particularly suited for blending with other alkyds. If blended with a lower VOC alkyd, the non-aqueous dispersions of this invention can produce extremely low VOC coating compositions. If blended with a higher VOC alkyd, the non-aqueous dispersions of this invention can help to reduce the overall VOC of such alkyd.

Suitable rheology modifiers are well known in the art and can comprise organoclays, fumed silica, dehydrated castor oil organic derivatives (exemplary tradenames: Thixatrol (R), NL Industries; Flowtone (R), English China Clay), polyamide resins, polyamide modified alkyds, MPA-60, Rheox, alkylbenzene sulphonate derivatives, aluminum, calcium and zinc stearates, calcium soyate, and the like.

Suitable extenders are also well known in the art and can comprise amorphous, diatomaceous, fumed, quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like.

Suitable pigments are well known in the art and can comprise for example, titanium dioxide, carbon black, graphite, ceramic black, antimony sulfide, black iron oxide, aluminum pastes, yellow iron oxide, red iron oxide, iron blue, phthalo blue, nickel titanate, dianisidine orange, dinitroaniline orange, imidazole orange, quinacridone red, violet and magenta, toluidine red, molybdate orange, and the like.

Suitable solvents can comprise propylene and ethylene glycol ethers and acetates, alcohols, ketones, aliphatic and aromatic hydrocarbons and naphthas, wood distillates, turpentine, pine oil, and the like. Solvent selection is limited primarily by the desire to maintain the overall VOC level of the coating composition below 305 g/l, preferably below 250 g/l.

Anti-skinning agents such as methyl ethyl ketoxime, o-cresol, and hydroquinone can be included.

Drying agents can comprise standard metallic and rare earth driers such as cobalt, calcium, potassium, barium, zinc, manganese, tin, aluminum, zirconium and vanadium napthenates, octoates, hexanates, and isodecanoates. A particularly preferred drier composition is a combination of cobalt, calcium and zirconium driers present in an amount from about 0.1% to about 2.5% by weight of the coating composition.

Suitable dispersants and surfactants can comprise any of the readily available dispersants and surfactants to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, and the like.

The following examples are intended to illustrate the invention but are not presented as limitations upon the scope of the claims.

EXAMPLE ONE—PREPARATION OF ALKYD

Charge 854.5 grams of alkali refined soya oil, 356.5 grams of linseed oil and 182.0 grams of trimelletic anhydride to a 3 liter, 4-necked, round bottom flask equipped with inert gas, mechanical stirrer and barrett tube. Heat the contents to 480° F. and hold for one hour. Cool the contents to 350° F. and add 154.4 grams of trimethylol propane. Heat to 480° F. and hold for an Acid Value less than 13.

The resultant alkyd has a NVM of 100%, a Gardner-Holdt viscosity of Y-Z, an Acid Value of 12.3, an $M_z$ of approximately 41,300, an oil length of about 80 and a Hydroxyl No. of 34.

EXAMPLE TWO—PREPARATION OF ALKYD

Charge 14,925 grams of alkali refined soya oil and 2240 grams of trimelletic anhydride to a reactor equipped with inert gas and a mechanical stirrer. Heat the contents to 480° F. and hold for about one hour. Cool to about 350° F. and add 1704 grams of trimethylol ethane and 368 grams of xylene. Heat the contents to about 480° F. and hold for an Acid Value less than or equal to 10. Continue to hold the contents at this temperature until residual xylene is stripped off.

The resulting alkyd has an NVM of approximately 99.5%, a Gardner-Holdt viscosity of about X, an Acid Value of about 9.9, an $M_z$ of about 102,000, an oil length of about 79 and a Hydroxyl No. of about 47.

EXAMPLE THREE—PREPARATION OF ALKYD

Charge 1354.7 grams of soya oil and 243.3 grams of trimelletic anhydride to a 3 liter, 4-necked, round bottom flask equipped with inert gas blanket and mechanical stirrer. Heat the contents to about 480° F. and hold for about one-half hour. Cool to about 400° F. and add 255.3 grams of trimethylol propane, 25.6 grams of trimethylol ethane and 408.2 grams of linseed fatty acid. Heat to 480° F. and hold for an Acid Value less than or equal to 13.

The resulting alkyd has an NVM of about 100%, a GardnerHoldt viscosity of about W, an Acid Value of about 9.7, an $M_z$ of about 28,200, an oil length of about 80 and a Hydroxyl No. of about 37.

487.5 grams of hydroxy ethyl acrylate, and 10 grams of 2-mercapto ethanol (chain transfer agent).

Solution #2: 100 grams of mineral spirits and 10 grams of t-butyl butyl peroctoate (initiator).

Upon completion of the addition of Solutions #1 and #2, begin a 90 minute addition of a "chase" comprising 100 grams of mineral spirits, 28 grams of cumene hydroperoxide, and approximately four (4) drops of vanadium naphthenate. Hold the temperature at 100° C. for approximately ½ hour after the chase has been completely added. Shut off heat and filter the contents of the reactor through a 15 micron filter.

The resulting non-aqueous dispersion has a NVM of approximately 70.2% and a viscosity of 360/290 centipoise using the Brookfield LVT Spindle #3 at 30/60 rpm.

EXAMPLE FIVE—PREPARATION OF NAD

Charge 366 grams of the alkyd prepared according to Example Two and 500 grams of mineral spirits to a reactor equipped with a mechanical stirrer. Heat to 100° C. Begin a two hour dropwise addition of Solutions #1 and #2 below:

Solution #1: 545 grams of alkyd prepared according to Example Two, 975 grams of methyl methacrylate, 487.5 grams of hydroxy ethyl acrylate, and 10 grams of 2-mercapto mercapto ethanol (chain transfer agent).

Solution #2: 100 grams of mineral spirits and 11 grams of t-butyl peroctoate (initiator).

Upon completion of the addition of Solutions #1 and #2, begin a 90 minute addition of a "chase" comprising 100 grams of mineral spirits, 35 grams of cumene hydroperoxide, and approximately four (4) drops of vanadium naphthenate. Hold the temperature at 100° C. for approximately one hour after the chase has been completely added. Shut off heat and filter the contents of the reactor through a 15 micron filter.

The resulting non-aqueous dispersion has a NVM of approximately 75% and a viscosity of 270/285 centipoise using the Brookfield LVT Spindle #3 at 30/60 rpm.

EXAMPLE SIX—PREPARATION OF NAD

Charge 366 grams of the alkyd prepared according to Example Two and 426 grams of mineral spirits to a

TABLE 1

| | COMPARISON OF ALKYDS V. TRADITIONAL ALKYDS | | | | |
|---|---|---|---|---|---|
| ALKYD | 1 | 2 | 3 | 4 | 5 |
| PROCESS | Fatty Acid Esterification | Alcoholysis | Example 1 | Example 2 | Example 3 |
| COMPONENTS | Soya Fatty Acid | Soya Oil | See Ex. 1 | See Ex. 2 | See Ex. 3 |
| | PE | PE | See Ex. 1 | See Ex. 2 | See Ex. 3 |
| | CA | CA | See Ex. 1 | See Ex. 2 | See Ex. 3 |
| | IPA | IPA | See Ex. 1 | See Ex. 2 | See Ex. 3 |
| OIL LENGTH | 66 | 52 | 80 | 79 | 80 |
| HYDROXYL # | 55 | 80 | 34 | 47 | 37 |
| NVM | 91.5 | 90 | 100 | 98.8 | 100 |
| VISC (cps) | 8000 | 5000 | 2000 | 1300 | 1000 |
| $M_z$ | $1.96 \times 10^7$ | 9799 | 41300 | 101909 | 28214 | where: PE = pentaerythritol, CA = crotonic acid, and IPA = isophthalic acid.

EXAMPLE FOUR—PREPARATION OF NAD

Charge 367 grams of the alkyd prepared according to Example One and 500 grams of mineral spirits to a reactor equipped with a mechanical stirrer. Heat to 100 C. Begin a two hour dropwise addition of Solutions #1 and #2 below:

Solution #1: 547 grams of alkyd prepared according to Example One, 975 grams of methyl methacrylate, reactor equipped with a mechanical stirrer. Heat to 100° C. Begin a two hour dropwise addition of Solutions #1 and #2 below:

Solution #1: 702 grams of alkyd prepared according to Example Two, 870 grams of methyl methacrylate, 435 grams of hydroxy ethyl acrylate, and 10 grams of 2-mercapto ethanol (chain transfer agent).

Solution #2: 100 grams of mineral spirits and 11 grams of t-butyl peroctoate (initiator).

Upon completion of the addition of Solutions #1 and #2, begin a 90 minute addition of a "chase" comprising 100 grams of mineral spirits, 35 grams of cumene hydroperoxide, and approximately five (5) drops of vanadium naphthenate. Hold the temperature at 100° C. for approximately one hour after the chase has been completely added. Shut off heat and filter the contents of the reactor through a 15 micron filter.

The resulting non-aqueous dispersion has a NVM of approximately 76.3% and a viscosity of 280/290 centipoise using the Brookfield LVT Spindle #3 at 30/60 rpm.

EXAMPLE SEVEN—PREPARATION OF NAD

Charge 300 grams of the alkyd prepared according to Example Three and 213 grams of mineral spirits to a reactor equipped with a mechanical stirrer. Heat to 100° C. Begin a two hour dropwise addition of Solutions #1 and #2 below:

Solution #1: 713 grams of alkyd prepared according to Example Three, 900 grams of methyl methacrylate, 338 grams of hydroxy ethyl acrylate, and 8 grams of 2-mercapto ethanol (chain transfer agent).

Solution #2: 100 grams of mineral spirits and 10 grams of t-butyl peroctoate (initiator).

Upon completion of the addition of Solutions #1 and #2, begin a 90 minute addition of a "chase" comprising 100 grams of mineral spirits, 30 grams of cumene hydroperoxide, and approximately four (4) drops of vanadium naphthenate. Hold the temperature at 100° C. for approximately one hour after the chase has been completely added. Shut off heat and filter the contents of the reactor through a 15 micron filter.

The resulting non-aqueous dispersion has a NVM of approximately 83.1% and a viscosity of 1040/1100 centipoise using the Brookfield LVT Spindle #3 at 30/60 rpm.

EXAMPLE EIGHT—PREPARATION OF NAD

Charge 300 grams of the alkyd prepared according to Example Three to a reactor equipped with a mechanical stirrer. Heat to 100° C. Begin a two hour dropwise addition of Solutions #1 and #2 below:

Solution #1: 563 grams of alkyd prepared according to Example Three, 900 grams of methyl methacrylate, 338 grams of hydroxy ethyl acrylate, and 6 grams of 2-mercapto ethanol (chain transfer agent).

Solution #2: 100 grams of alkyd prepared according to Example Three and 10 grams of t-butyl peroctoate Upon completion of the addition of Solutions #1 and #2, begin a 90 minute addition of a "chase" comprising 50 grams of alkyd prepared according to Example Three, 30 grams of cumene hydroperoxide, and approximately four (4) drops of vanadium naphthenate. Hold the temperature at 100° C. for approximately one hour after the chase has been completely added. Shut off heat and filter the contents of the reactor through a 15 micron filter.

The resulting non-aqueous dispersion has a NVM of approximately 98% and a viscosity of 37,000 centipoise using the Brookfield LVT Spindle #3 at 30 rpm.

EXAMPLE NINE—305 g/l VOC PAINT PREPARATION

A 305 g/l VOC gloss alkyd paint having a KU value of about 95 can be made with the following ingredients:

| | |
|---|---|
| 1. NAD prepared according to Example Four: | 706.37 g |
| 2. Mineral Spirits | 15.18 |
| 3. Soya Lecithin | 3.00 |
| 4. Tetrachloroisophthalonitrile (Mildewcide) | 10.00 |
| 5. Rutile Titanium Dioxide | 190.00 |
| 6. Mineral Spirits | 0.06 |
| 7. 12% Cobalt Catalyst | 1.64 |
| 8. 18% Zr 2-ethylhexanoate | 4.12 |
| 9. 10% Ca Synthetic Acid Drier | 2.48 |
| 10. Methyl ethyl ketoxime (anti-skinning agent) | 2.00 |
| 11. Mineral Spirits | 14.99 |

Procedure: Add enough of #1 and #2 to the mixing vessel to cover the mixing blades and have good mixing. Mix #3, #4 and #5 in order. Grind the composition until a value of 7 on the Hegman scale is reached. Add #6 and the remainder of #1 and #2 to stabilize the composition. Add #7, #8, #9, #10 and #11.

EXAMPLE TEN—250 g/l VOC PAINT PREPARATION 250 g/l VOC gloss alkyd paint having a KU viscosity value of about 76 can be made with the following ingredients:

| | |
|---|---|
| 1. NAD prepared according to Example Five: | 731.57 g |
| 2. Mineral Spirits | 15.05 |
| 3. Soya Lecithin | 3.00 |
| 4. Tetrachloroisophthalonitrile (Mildewcide) | 10.00 |
| 5. Rutile Titanium Dioxide | 190.00 |
| 6. Mineral Spirits | 0.06 |
| 7. 12% Cobalt Catalyst | 1.88 |
| 8. 18% Zr 2-ethylhexanoate | 4.64 |
| 9. 10% Ca Synthetic Acid Drier | 2.80 |
| 10. Methyl ethyl ketoxime (anti-skinning agent) | 2.00 |
| 11. Mineral Spirits | 6.41 |

Procedure: Add enough of #1 and #2 to the mixing vessel to cover the mixing blades and have good mixing. Mix #3, #4 and #5 in order. Grind the composition until a value of 7 on the Hegman scale is reached. Add #6 and the remainder of #1 and #2 to stabilize the composition. Add #7, #8, #9, #10 and #11.

EXAMPLE ELEVEN—230 g/l PAINT PREPARATION

A 230 g/l VOC gloss alkyd paint having a KU viscosity value of 74 was prepared with the following ingredients:

| | |
|---|---|
| 1. NAD prepared according to Example Seven: | 694.27 lb |
| 2. Soya Lecithin | 4.06 |
| 3. Tetrachloroisophthalonitrile (Mildewcide) | 10.12 |
| 4. Rutile Titanium Dioxide | 190.21 |
| 5. Mineral Spirits | 31.20 |
| 6. 12% Cobalt Catalyst | 1.94 |
| 7. 18% Zr 2-ethylhexanoate | 8.16 |
| 8. 10% Ca Synthetic Acid Drier | 15.76 |
| 9. Methyl ethyl ketoxime (anti-skinning agent) | 2.55 |
| 10. Mineral Spirits | 32.56 |

Procedure: Add enough of #1 to the mixing vessel to cover the mixing blades and have good mixing. Mix #2,

3 and #4 in order. Add #5. Grind the composition until a value of 7 on the Hegman scale is reached. Add the remainder of #1 to stabilize the composition. Add #6, #7, #8, #9 and #10.

EXAMPLE TWELVE—250 g/l VOC PAINT PREPARATION

A 250 g/l VOC semi-gloss alkyd paint having a KU viscosity value of 85 can be made with the following ingredients:

| 1. NAD prepared according to Example Eight: | 208.68 g |
|---|---|
| 2. Mineral Spirits | 121.86 |
| 3. Soya Lecithin | 7.88 |
| 4. Rutile Titanium Dioxide | 219.89 |
| 5. Wet Ground Calcium Carbonate | 377.13 |
| 6. NAD prepared according to Example Eight: | 202.28 |
| 7. Cobalt Catalyst 21% | 1.50 |
| 8. Mineral Spirits | 19.18 |
| 9. 12% Cobalt Catalyst | 0.60 |
| 10. 10% Ca Synthetic Acid Drier | 3.60 |
| 11. Methyl ethyl ketoxime (anti-skinning agent) | 2.00 |
| 12. Mineral Spirits | 51.95 |
| 13. Quinacrinone Red Pigment | 0.01 |
| 14. Phthalo Blue Pigment | 0.01 |

Procedure: Add #1, #2, #3, #4 and #5 to the mixing vessel and grind on high speed until a value of 7 on the Hegman scale is reached. Add #6 to stabilize the composition. Add #7 through #14 in order.

While this invention has been described by a number of specific embodiments, it is obvious that other variations and modifications may be made without departing from the spirit and the scope of the invention as set forth in the appended claims.

What is claimed is:

1. A process for producing an alkyd having a non-volatile materials content greater than about 75%, a volatile organic content less than about 305 g/l, and a molecular weight, $M_z$, greater than about 20,000, comprising:
   (a) first, reacting a triglyceride oil with a trifunctional carboxylic acid or trifunctional carboxylic anhydride, and
   (b) second, reacting the intermediate of step a) with a trifunctional alcohol or a mixture of tri- and di-functional alcohols;
under reaction conditions such that the molar ratio of triglyceride oil to trifunctional carboxylic acid or anhydride is from about 1:1 to about 1.75:1 and the molar ratio of trifunctional alcohol to trifunctional carboxylic acid or anhydride is from about 1:1 to about 1.5:1.

2. The process of claim 1 wherein the triglyceride oil is selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil and mixtures thereof.

3. The process of claim 2 wherein the triglyceride oil is selected from the group consisting of soya oil, dehydrated castor oil, linseed oil, and mixtures thereof.

4. The process of claim 3 wherein the trifunctional carboxylic acid is trimelletic acid.

5. The process of claim 3 wherein the trifunctional carboxylic anhydride is trimelletic anhydride.

6. The process of claim 1 wherein the trifunctional alcohol is selected from the group consisting of trimethylol propane, trimethylol ethane, and mixtures thereof.

7. The process of claim 5 wherein the trifunctional alcohol is selected from the group consisting of trimethylol propane, trimethylol ethane, and mixtures thereof.

8. The product produced according to claim 1.

9. The product produced according to claim 7.

10. A process for producing a non-aqueous dispersion of addition polymers in an alkyd medium comprising:
   (a) forming an alkyd having a non-volatile materials content greater than about 75%, a volatile organic content of less than about 305 g/l, and a molecular weight, $M_z$, greater than about 20,000, by:
      (i) first, reacting a triglyceride oil with a tri functional carboxylic acid or trifunctional carboxylic anhydride, and
      (ii) second, reacting the intermediate of step i) with a trifunctional alcohol or a mixture of tri- and di functional alcohols;
   under reaction conditions such that the molar ratio of triglyceride oil to trifunctional carboxylic acid or anhydride is from about 1:1 to about 1.75:1 and the molar ratio of trifunctional alcohol to trifunctional carboxylic acid or anhydride is from about 1:1 to about 1.5:1; and
   (b) polymerizing one or more monomers in the presence of the alkyd via the free radical addition mechanism.

11. The process of claim 10 wherein the triglyceride oil is selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil and mixtures thereof.

12. The process of claim 11 wherein the triglyceride oil is selected from the group consisting of soya oil, dehydrated castor oil, linseed oil, and mixtures thereof.

13. The process of claim 12 wherein the trifunctional carboxylic acid is trimelletic acid.

14. The process of claim 12 wherein the trifunctional carboxylic anhydride is trimelletic anhydride.

15. The process of claim 10 wherein the trifunctional alcohol is selected from the group consisting of trimethylol propane, trimethylol ethane, and mixtures thereof.

16. The process of claim 14 wherein the trifunctional alcohol is selected from the group consisting of trimethylol propane, trimethylol ethane, and mixtures thereof.

17. The process of claim 10 wherein the monomers are selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, methyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof, and preformed polymers and polymeric intermediates thereof.

18. The process of claim 16 wherein the monomers are selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof, and preformed polymers and polymeric intermediates thereof.

19. The process of claim 17 wherein between about 5% and 35% by weight of the monomer charge comprises at least one monomer having hydroxy functionality.

20. The product produced according to claim 17.

21. The product produced according to claim 19.

22. A process for producing a coating composition comprising:
  (a) forming an alkyd having a non-volatile materials content greater than about 75%, a volatile organic content of less than about 305 g/l, and a molecular weight, $M_z$, greater than about 20,000, by:
    (i) first, reacting a triglyceride oil with a trifunctional carboxylic acid or trifunctional carboxylic anhydride, and
    (ii) second, reacting the intermediate of step i) with a trifunctional alcohol or a mixture of tri- and difunctional alcohols; under reaction conditions such that the molar ratio of triglyceride oil to trifunctional carboxylic acid or anhydride is from about 1:1 to about 1.75:1 and the molar ratio of trifunctional alcohol to trifunctional carboxylic acid or anhydride is from about 1:1 to about 1.5:1;
  (b) polymerizing one or more monomers in the presence of the alkyd via the free radical addition mechanism to produce a non-aqueous dispersion; and
  (c) mixing the non-aqueous dispersion of step b) with at least one other paint ingredient selected from the group consisting of rheology modifiers, thixatropes, extenders, colors and pigments, solvents, anti-skinning agents, drying agents, dispersants and surfactants, fungicides, mildewcides, preservatives, UV absorbers, anti-marring agents, flow and leveling agents, fragrances, defoaming agents, chelating agents, flattening agents, anti-rusting agents and mixtures thereof.

23. The process of claim 22 wherein the triglyceride oil is selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil and mixtures thereof.

24. The process of claim 23 wherein the triglyceride oil is selected from the group consisting of soya oil, dehydrated castor oil, linseed oil, and mixtures thereof.

25. The process of claim 24 wherein the trifunctional carboxylic acid is trimelletic acid.

26. The process of claim 24 wherein the trifunctional carboxylic anhydride is trimelletic anhydride.

27. The process of claim 22 wherein the trifunctional alcohol is selected from the group consisting of trimethylol propane, trimethylol ethane, and mixtures thereof.

28. The process of claim 26 wherein the trifunctional alcohol is selected from the group consisting of trimethylol propane, trimethylol ethane, and mixtures thereof.

29. The process of claim 22 wherein the monomers are selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, methyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof, and preformed polymers and polymeric intermediates thereof.

30. The process of claim 28 wherein the monomers are selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof, and preformed polymers and polymeric intermediates thereof.

31. The process of claim 29 wherein between about 5% and 35% by weight of the monomer charge comprises at least one monomer having hydroxy functionality.

32. The product produced according to claim 29.

33. The product produced according to claim 31.

* * * * *